(12) United States Patent
Kashimoto

(10) Patent No.: US 11,676,409 B2
(45) Date of Patent: Jun. 13, 2023

(54) FORM DATA ACQUIREMENT SYSTEM AND NON-TRANSITORY COMPUTER READABLE RECORDING MEDIUM STORING FORM DATA ACQUIRING PROGRAM

(71) Applicant: KYOCERA Document Solutions Inc., Osaka (JP)

(72) Inventor: Yosuke Kashimoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 253 days.

(21) Appl. No.: 17/315,521

(22) Filed: May 10, 2021

(65) Prior Publication Data

US 2021/0357632 A1 Nov. 18, 2021

(30) Foreign Application Priority Data

May 12, 2020 (JP) .............................. JP2020-084142

(51) Int. Cl.
  *G06K 9/00* (2022.01)
  *G06V 30/10* (2022.01)
  *G06V 30/412* (2022.01)
  *G06F 18/21* (2023.01)
  *G06V 10/776* (2022.01)

(52) U.S. Cl.
  CPC ............ *G06V 30/10* (2022.01); *G06F 18/217* (2023.01); *G06V 10/776* (2022.01); *G06V 30/412* (2022.01)

(58) Field of Classification Search
  CPC .... G06V 30/10; G06V 10/776; G06V 30/412; G06F 18/217
  See application file for complete search history.

(56) References Cited

U.S. PATENT DOCUMENTS

| 11,328,504 B2* | 5/2022 | Nakatani | G06V 30/412 |
| 2019/0362143 A1* | 11/2019 | Nakamura | G06V 30/416 |
| 2021/0192200 A1* | 6/2021 | Sugimoto | G06V 30/414 |
| 2021/0303895 A1* | 9/2021 | Soga | G06N 5/04 |

FOREIGN PATENT DOCUMENTS

JP   2019-079488   5/2019

* cited by examiner

*Primary Examiner* — Dhaval V Patel
(74) *Attorney, Agent, or Firm* — Lex IP Meister, PLLC

(57) ABSTRACT

An information processing apparatus learns an attribute-positional relation in a form for learning to create an attribute-positional relation rule for a character string in a form, determines correspondence between a character string in a result of character recognition executed on an image of the form for learning and an attribute in form data for learning based on the form for learning to create a character string attribute model for acquiring a probability of an attribute of the character string in the form, applies the character string attribute model to a character string in a result of character recognition executed on an image of the form to acquire the probability of an attribute, and corrects the probability based on a position in the form of the character string in the result of the character recognition executed on the image of the form and the attribute-positional relation rule.

6 Claims, 15 Drawing Sheets

FIG. 2

BILL

No    1234-5678

○○ CORPORATION    BILLING DATE: NOVEMBER 22, 2019
  123-4567
  ○○ BUILDING 4F    CORPORATION △△
  1-2-3 ○○-CHO, ○○-KU, TOKYO    987-6543
  ○○ SECTION, ○○ DEPARTMENT    △△△△ 6F
  MR. ××○○    9-8-7 △△△, △-KU,
WE RESPECTFULLY CHARGE    △△-SHI, KANAGAWA
YOU THE SUM BELOW.

| SUM (TAX INCLUSIVE) | ¥2640 |
|---|---|

| PRODUCT | | UNIT PRICE (YEN) | QUANTITY | PRICE (YEN) |
|---|---|---|---|---|
| 3456-78 | BALLPOINT PEN | 500 | 1 | 500 |
| 1234-56 | MECHANICAL PENCIL | 200 | 2 | 400 |
| 9876 | PAPER | 100 | 5 | 500 |
| 5432 | NAMEPLATE | 100 | 10 | 1,000 |
| | | | | |
| | | | | |
| | | | | |
| | | | | |
| | | | | |
| | | | SUBTOTAL | 2400 |
| | | | CONSUMPTION TAX | 240 |
| | | | SUM | 2640 |

| PAYEE |
|---|
| ×× BRANCH, ×× BANK |
| (SAVINGS ACCOUNT NO.) |
| 0000000 |
| THE TRANSFER FEE IS TO BE |
| BORNE BY YOU. |

| REMARKS |
|---|
| TERM FOR PAYMENT: |
|    DECEMBER 25, 2019 |

FIG. 3

INVOICE

OO CORPORATION 123-4567
OO BUILDING 4F
1-2-3 OO-CHO, OO-KU, TOKYO
MR. ××OO

●● CORPORATION 012-3456
7-8-9 ●●-KU, OSAKA
TEL 012-345-6789
FAX 012-345-6780

| CUSTOMER CODE | DATE OF ISSUE | INVOICE NO. | NUMBER OF SLIPS | SCHEDULED DATE OF PAYMENT |
|---|---|---|---|---|
| A1234 | 11/23 | 19-9876 | 1 | 19/12/15 |

| AMOUNT OF PURCHASE | CONSUMPTION TAX | SUM CHARGED |
|---|---|---|
| 132000 | 13200 | 145200 |

| DATE | SLIP NO. ORDERING NO. | PRODUCT CODE ORDER NO. | NAME OF PRODUCT ORDER RECEPTION NO. | QUANTITY | UNIT PRICE | AMOUNT OF MONEY | CONSUMPTION TAX |
|---|---|---|---|---|---|---|---|
| 11/23 | 1111 | 2222 | BOOK 1234 | 100 | 800 | 80000 | 8000 |
| | | 3333 | NAMEPLATE 1235 | 120 | 100 | 12000 | 1200 |
| | | 1-0001 | BOUQUET 1236 | 20 | 2000 | 40000 | 4000 |
| | | | SLIP SUM | | | 132000 | 13200 |

OUR PERSON IN CHARGE: ●△□ ASSIGNED

AGREEMENT
..........................................................
..........................................................
.............................................

FIG. 6A

SLIP INFORMATION TABLE

| BILL NO. | BILLING DATE | TERM FOR PAYMENT | BILLER | ZIP CODE OF BILLER | ADDRESS OF BILLER | BILLING DESTINATION | ZIP CODE OF BILLING DESTINATION | ADDRESS OF BILLING DESTINATION | SUBTOTAL | CONSUMPTION TAX IN TOTAL | SUM |
|---|---|---|---|---|---|---|---|---|---|---|---|
| 1234-5678 | 2019/11/22 | 2019/12/25 | CORPORATION △△ | 987-6543 | △△△△ 6F, 9-8-7 △△△, △-KU, △△-SHI, KANAGAWA | ○○ CORPORATION | 123-4567 | ○○ BUILDING 4F, 1-2-3 ○○-CHO, ○○-KU, TOKYO | 2400 | 240 | 2640 |
| 19-9876 | 2019/11/23 | 2019/12/15 | ●● CORPORATION | 012-3456 | 7-8-9 ●●-KU, OSAKA | ○○ CORPORATION | 123-4567 | ○○ BUILDING 4F, 1-2-3 ○○-CHO, ○○-KU, TOKYO | 132000 | 13200 | 145200 |
| ... | ... | ... | ... | ... | ... | ... | ... | ... | ... | ... | ... |

FIG. 6B

ARTICLE TABLE

| BILL NO. | PRODUCT NAME | PRODUCT CODE | UNIT PRICE | QUANTITY | PRICE | CONSUMPTION TAX |
|---|---|---|---|---|---|---|
| 1234-5678 | BALLPOINT PEN | 3456-78 | 500 | 1 | 500 | 50 |
| 1234-5678 | MECHANICAL PENCIL | 1234-56 | 200 | 2 | 400 | 40 |
| 1234-5678 | PAPER | 9876 | 100 | 5 | 500 | 50 |
| 1234-5678 | NAMEPLATE | 5432 | 100 | 10 | 1000 | 100 |
| 19-9876 | BOOK | 2222 | 800 | 100 | 80000 | 8000 |
| 19-9876 | NAMEPLATE | 3333 | 100 | 120 | 12000 | 1200 |
| 19-9876 | BOUQUET | 1-0001 | 2000 | 20 | 40000 | 4000 |
| ... | ... | ... | ... | ... | ... | ... |

SLIP INFORMATION TABLE

| BILL NO. | BILLING DATE | TERM FOR PAYMENT | BILLER | ZIP CODE OF BILLER | ADDRESS OF BILLER | BILLING DESTINATION | ZIP CODE OF BILLING DESTINATION | ADDRESS OF BILLING DESTINATION | SUBTOTAL | CONSUMPTION TAX IN TOTAL | SUM |
|---|---|---|---|---|---|---|---|---|---|---|---|
| 1234-5678 | NOVEMBER 22, 2019 | DECEMBER 25, 2019 | CORPORATION △△ | 987-6543 | △△△ 6F, 9-8-7 △△△, △-KU, △△-SHI, KANAGAWA | ○○ CORPORATION | 123-4567 | ○○ BUILDING 4F, 1-2-3 ○○-CHO, ○○-KU, TOKYO | 2400 | 240 | 2640 |

FIG. 13B

ARTICLE TABLE

| BILL NO. | PRODUCT NAME | PRODUCT CODE | UNIT PRICE | QUANTITY | PRICE | CONSUMPTION TAX |
|---|---|---|---|---|---|---|
| 1234-5678 | BALLPOINT PEN | 3456-78 | 500 | 1 | 500 | unknown |
| 1234-5678 | MECHANICAL PENCIL | 1234-56 | 200 | 2 | 400 | unknown |
| 1234-5678 | PAPER | 9676 | 100 | 5 | 500 | unknown |
| 1234-5678 | NAMEPLATE | 5432 | 100 | 10 | 1,000 | unknown |

FIG. 14A

SLIP INFORMATION TABLE

| BILL NO. | BILLING DATE | TERM FOR PAYMENT | BILLER | ZIP CODE OF BILLER | ADDRESS OF BILLER | BILLING DESTINATION | ZIP CODE OF BILLING DESTINATION | ADDRESS OF BILLING DESTINATION | SUBTOTAL | CONSUMPTION TAX IN TOTAL | SUM |
|---|---|---|---|---|---|---|---|---|---|---|---|
| 1234-5678 | 2019/11/22 | 2019/12/25 | CORPORATION △△ | 987-6543 | △△△ 6F, 9-8-7 △△△, △-KU, △△-SHI, KANAGAWA | ○○ CORPORATION | 123-4567 | ○○ BUILDING 4F, 1-2-3 ○○-CHO, ○○-KU, TOKYO | 2400 | 240 | 2640 |

FIG. 14B

ARTICLE TABLE

| BILL NO. | PRODUCT NAME | PRODUCT CODE | UNIT PRICE | QUANTITY | PRICE | CONSUMPTION TAX |
|---|---|---|---|---|---|---|
| 1234-5678 | BALLPOINT PEN | 3456-78 | 500 | 1 | 500 | 50 |
| 1234-5678 | MECHANICAL PENCIL | 1234-56 | 200 | 2 | 400 | 40 |
| 1234-5678 | PAPER | 9876 | 100 | 5 | 500 | 50 |
| 1234-5678 | NAMEPLATE | 5432 | 100 | 10 | 1000 | 100 |

FIG. 15

MEDICAL EXAMINATION REPORT  
DATE OF EXAMINATION: 2019/11/26

| NAME | TARO KYOSERA |
|---|---|
| INDIVIDUAL NO. | 12345678 |
| DATE OF BIRTH | 1990/11/11 |

HEIGHT AND WEIGHT: 175cm 70kg

| EXAMINATION ITEM | REFERENCE VALUE | VALUE BEFORE LAST | LAST VALUE | CURRENT VALUE |
|---|---|---|---|---|
| NUTRITION | | | | |
|    TOTAL PROTEIN | | | | |
|    ALBUMIN | | | | |
| LIVER/GALLBLADDER | | | | |
|    TOTAL BILIRUBIN | | | | |
|    GOT | | | | |
|    GPT | | | | |
|    ALP | | | | |
| LIPID | | | | |
|    HDL CHOLESTEROL | | | | |
|    LDL CHOLESTEROL | | | | |
|    TRIGLYCERIDE | | | | |
| URINE ANALYSIS | | | | |
|    GLUCOSE | | | | |
|    ARUPUTON OXIDE | | | | |
| BLOOD ANALYSIS | | | | |
|    ERYTHROCYTE COUNT | | | | |
|    HEMOGLOBIN | | | | |
|    HEMATOCRIT | | | | |
|    MCV | | | | |
|    MCH | | | | |
|    MCHC | | | | |
|    PLATELET | | | | |
| ENDOCRINE | | | | |
|    T4 | | | | |
|    FT4 | | | | |
| INFECTION | | | | |
|    LEUKOCYTE COUNT | | | | |
|    FILARIA ANTIGEN | | | | |

FORM DATA ACQUIREMENT SYSTEM AND NON-TRANSITORY COMPUTER READABLE RECORDING MEDIUM STORING FORM DATA ACQUIRING PROGRAM

INCORPORATION BY REFERENCE

This application is based upon, and claims the benefit of priority from, corresponding Japanese Patent Application No. 2020-084142 filed in the Japan Patent Office on May 12, 2020, the entire contents of which are incorporated herein by reference.

BACKGROUND

Field of the Invention

The present disclosure relates to a form data acquirement system that automatically acquires form data from a form as data based on the form, and a non-transitory computer readable recording medium storing a form data acquiring program.

Description of Related Art

In a typical, known form data acquirement system, a relationship determination rule as a rule for determining the relationship between words based on the positional relation between the words and the attribute of each word, as well as the attribute of each word contained in an atypical form, which attribute is specified using a dictionary, and the position of each word in the form serve as a basis for the specification of the attribute of each word.

SUMMARY

A form data acquirement system according to the present disclosure is a form data acquirement system that automatically acquires form data from a form as data based on the form, and includes a character string attribute learning unit that creates a character string attribute model for acquiring a probability of an attribute of a character string in the form, an attribute-positional relation learning unit that creates an attribute-positional relation rule indicating a rule of a positional relation of the attribute of the character string in the form, an attribute probability acquirement unit that applies the character string attribute model to a character string in a result of character recognition executed on an image of the form, and acquires a probability of an attribute, and an attribute probability correction unit that corrects the probability based on a position in the form of the character string in the result of the character recognition executed on the image of the form and the attribute-positional relation rule. The character string attribute learning unit executes determination of correspondence between a character string in a result of character recognition executed on an image of a form for learning that forms a basis for creation of form data for learning, which is the form data created from the form in advance, and an attribute in the form data for learning to create the character string attribute model. The attribute-positional relation learning unit learns an attribute-positional relation in the form for learning to create the attribute-positional relation rule.

A non-transitory computer readable recording medium according to the present disclosure stores a form data acquiring program. The form data acquiring program is a form data acquiring program for automatically acquiring form data from a form as data based on the form, and allows a computer to implement a character string attribute learning unit that creates a character string attribute model for acquiring a probability of an attribute of a character string in the form, an attribute-positional relation learning unit that creates an attribute-positional relation rule indicating a rule of a positional relation of the attribute of the character string in the form, an attribute probability acquirement unit that applies the character string attribute model to a character string in a result of character recognition executed on an image of the form, and acquires a probability of an attribute, and an attribute probability correction unit that corrects the probability based on a position in the form of the character string in the result of the character recognition executed on the image of the form and the attribute-positional relation rule. The character string attribute learning unit executes determination of correspondence between a character string in a result of character recognition executed on an image of a form for learning that forms a basis for creation of form data for learning, which is the form data created from the form in advance, and an attribute in the form data for learning to create the character string attribute model. The attribute-positional relation learning unit learns an attribute-positional relation in the form for learning to create the attribute-positional relation rule.

BRIEF DESCRIPTION OF THE DRAWINGS

FIG. 2 is a diagram illustrating an example of a form dealt with by the information processing system illustrated in FIG. 1;

FIG. 3 is a diagram illustrating another example of the form dealt with by the information processing system illustrated in FIG. 1;

FIG. 6A is a diagram illustrating an example of a slip information table of data for learning in FIG. 5;

FIG. 6B is a diagram illustrating an example of an article table of the data for learning in FIG. 5;

FIG. 12 is a diagram illustrating an example of attributes of the character strings contained in the form illustrated in FIG. 2, the attributes having been corrected by application of the attribute-positional relation rule;

FIG. 13A is a diagram illustrating an example of a slip information table of form data created based on the attributes illustrated in FIG. 12;

FIG. 13B is a diagram illustrating an example of an article table of the form data created based on the attributes illustrated in FIG. 12;

FIG. 14A is a diagram illustrating an example of a slip information table of form data automatically created from the form illustrated in FIG. 2;

FIG. 14B is a diagram illustrating an example of an article table of the form data automatically created from the form illustrated in FIG. 2; and FIG. 15 is a diagram illustrating yet another example of the form dealt with by the information processing system illustrated in FIG. 1.

DETAILED DESCRIPTION

In the following, an embodiment of the present disclosure is described with reference to the accompanying drawings.

First of all, description is made on the configuration of an information processing system according to an embodiment of the present disclosure.

Figure 1:
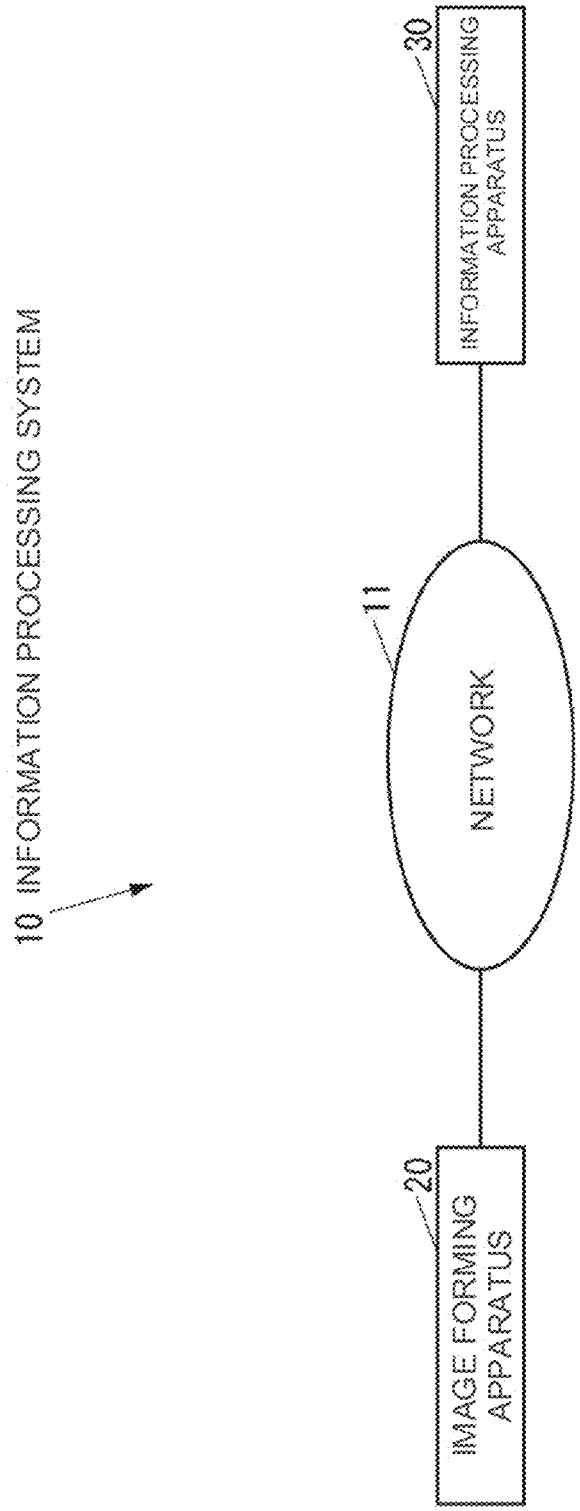
FIG. 1 is a block diagram of an information processing system according to an embodiment of the present disclosure.

FIG. 1 is a block diagram of an information processing system 10 according to the present embodiment.

As illustrated in FIG. 1, the information processing system 10 includes an image forming apparatus 20 such as a multifunction peripheral (MFP) and an information processing apparatus 30 as a computer such as a personal computer (PC).

The image forming apparatus 20 and the information processing apparatus 30 can communicably be connected to each other over a network 11 such as a local area network (LAN).

The information processing apparatus 30 is a form data acquirement system that automatically acquires form data from a form as data based on the form.

FIGS. 2 and 3 are each a diagram illustrating an example of a form dealt with by the information processing system 10.

The forms illustrated in FIGS. 2 and 3, respectively, are bills. As illustrated in FIGS. 2 and 3, for instance, bills dealt with by the information processing system 10 vary in format with the biller, for instance.

Figure 4:
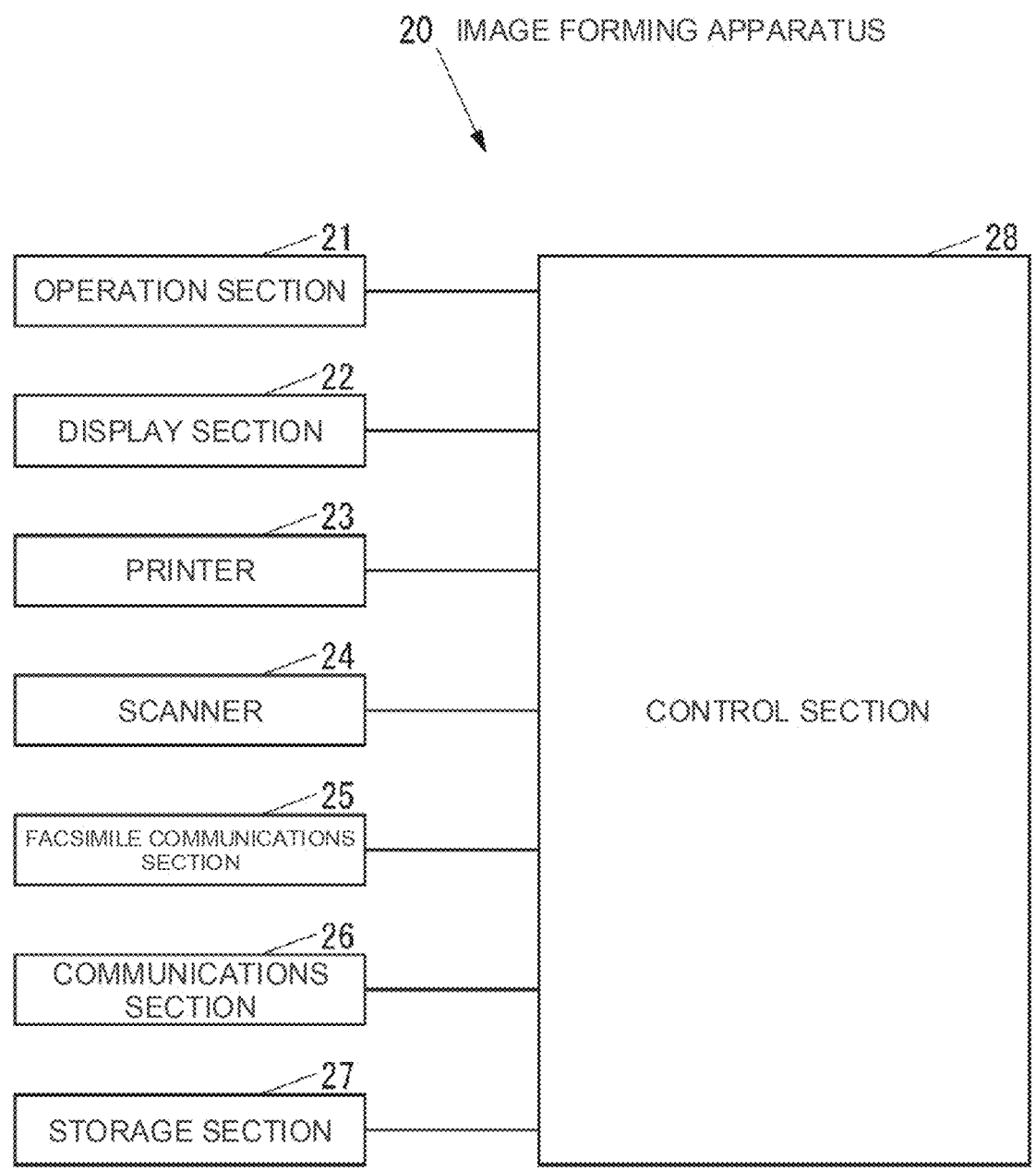
FIG. 4 is a block diagram of an image forming apparatus in FIG. 1 that is constituted of a multifunction peripheral (MFP) as an example.

FIG. 4 is a block diagram of the image forming apparatus 20, which is constituted of an MFP as an example.

As illustrated in FIG. 4, the image forming apparatus 20 includes an operation section 21 as an input device such as a button that allows input of various operations, a display section 22 as a display device such as a liquid crystal display (LCD) that displays various kinds of information, a printer 23 as a printing device that prints an image on a recording medium such as paper, a scanner 24 as a reading device that reads an image from an original, a facsimile communications section 25 as a facsimile device that handles facsimile communications with an external facsimile machine not illustrated through a communications line such as a public telephone line, a communications section 26 as a communications device that communicates with an external device over a network such as a LAN and the Internet, or not over a network but directly in a wired or wireless manner, a storage section 27 as a non-volatile storage device such as a semiconductor memory and a hard disk drive (HDD) that stores various kinds of information, and a control section 28 that controls the entire image forming apparatus 20.

The control section 28 includes, for instance, a central processing unit (CPU), a read only memory (ROM) storing programs and various kinds of data, and a random access memory (RAM) that is a memory as a volatile storage device used as a work area for the CPU of the control section 28.

The CPU of the control section 28 executes a program stored in the storage section 27 or the ROM of the control section 28.

Figure 5:
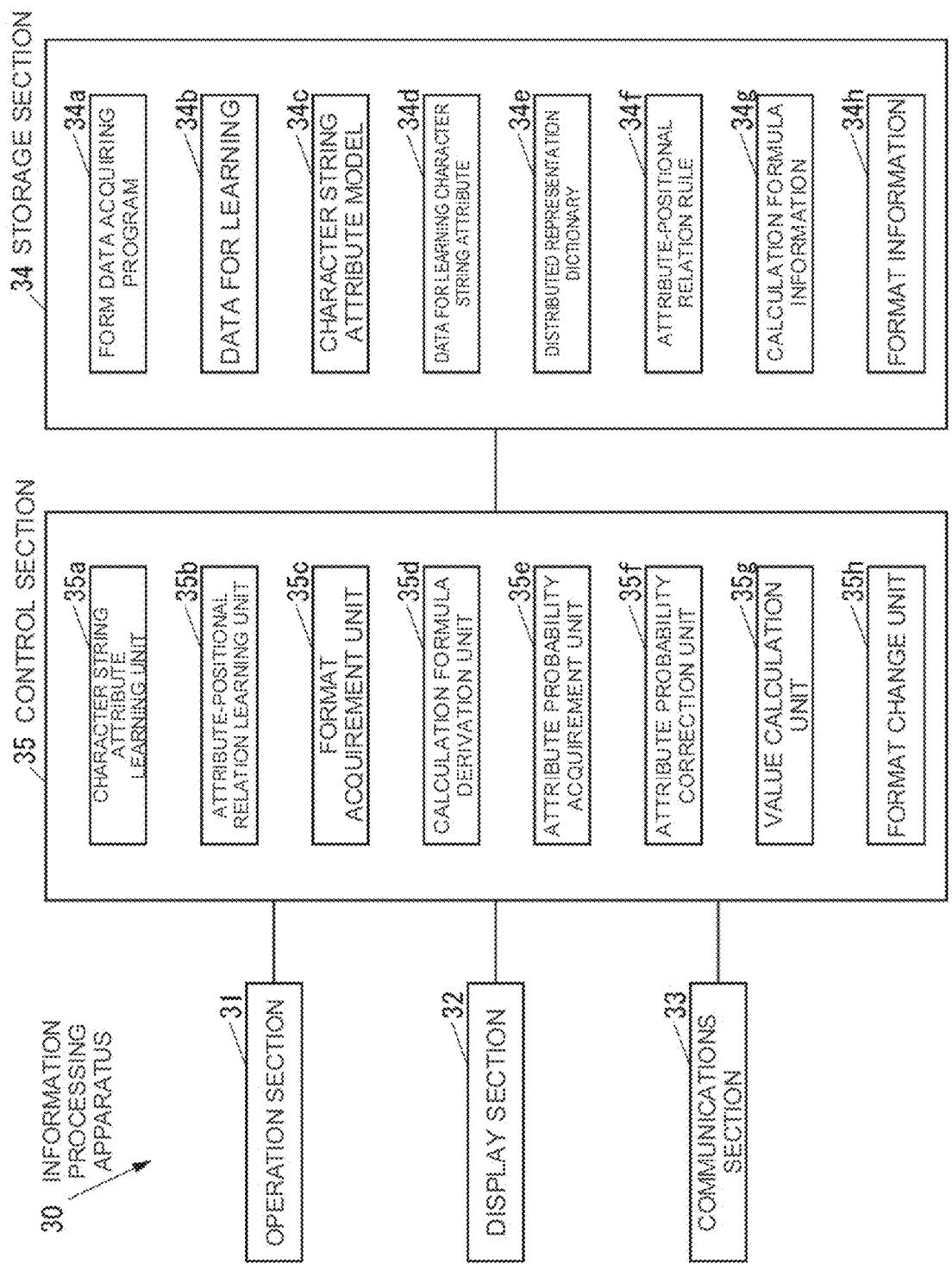
FIG. 5 is a block diagram of an information processing apparatus in FIG. 1.

FIG. 5 is a block diagram of the information processing apparatus 30.

As illustrated in FIG. 5, the information processing apparatus 30 includes an operation section 31 as an operation device such as a keyboard and a mouse that allows input of various operations, a display section 32 as a display device such as an LCD that displays various kinds of information, a communications section 33 as a communications device that communicates with an external device over a network such as a LAN and the Internet, or not over a network but directly in a wired or wireless manner, a storage section 34 as a non-volatile storage device such as a semiconductor memory and an HDD that stores various kinds of information, and a control section 35 that controls the entire information processing apparatus 30.

The storage section 34 stores a form data acquiring program 34a for automatically acquiring form data based on a form from the form. The form data acquiring program 34a may be installed in the information processing apparatus 30 during the manufacture of the information processing apparatus 30, or may additionally be installed in the information processing apparatus 30 from an external storing medium such as a compact disc (CD), a digital versatile disc (DVD), and a universal serial bus (USB) memory, or may additionally be installed in the information processing apparatus 30 over a network.

The storage section 34 is capable of storing data for learning 34b including the form data, which is created in advance from a form dealt with by the information processing system 10 by, for instance, data recognition and extraction by a person from the form dealt with by the information processing system 10 (such form data being hereinafter referred to as "form data for learning"). The data for learning 34b can include form data for learning of a plurality of forms.

FIGS. 6A and 6B are each a diagram illustrating an example of the data for learning 34b.

The data for learning 34b illustrated in FIGS. 6A and 6B are data extracted from bills, and include a slip information table illustrated in FIG. 6A that gives basic information on the bills and an article table illustrated in FIG. 6B that gives detailed information on articles in the bills.

In the data for learning 34b illustrated in FIGS. 6A and 6B, data with specific values are data extracted from the bill illustrated in FIG. 2 and the bill illustrated in FIG. 3. In the data for learning 34b illustrated in FIGS. 6A and 6B, data with a value "1234-5678" of an item "Bill No." are data extracted from the bill illustrated in FIG. 2, and data with a value "19-9876" of the item "Bill No." are data extracted from the bill illustrated in FIG. 3.

In the bill illustrated in FIG. 2, item names corresponding to the item "Bill No.", an item "Term for payment", and an item "Consumption tax in total" in the slip information table are represented as "No", "Term for payment", and "Consumption tax", respectively. Item names corresponding to items "Biller", "Zip code of biller", "Address of biller", "Billing destination", "Zip code of billing destination", and "Address of billing destination" in the slip information table are not seen in the bill illustrated in FIG. 2. The values of the items "Biller", "Zip code of biller", and "Address of biller" in the slip information table are each seen in a specified upper right position in the bill illustrated in FIG. 2. The values of the items "Billing destination", "Zip code of billing destination", and "Address of billing destination" in the slip information table are each seen in a specified upper left position in the bill illustrated in FIG. 2. The dates as values of an item "billing date" and the item "Term for payment" in the slip information table are different in format from the dates as values of an item "Billing date" and the item "Term for payment" in the bill illustrated in FIG. 2.

In the bill illustrated in FIG. 3, item names corresponding to the item "Bill No.", the item "Billing date", the item "Term for payment", an item "Subtotal", the item "Consumption tax in total", and an item "Sum" in the slip information table are represented as "Invoice No.", "Date of issue", "Scheduled date of payment", "Amount of purchase", "Consumption tax", and "Sum charged", respectively. Item names corresponding to the items "Biller", "Zip code of biller", "Address of biller", "Billing destination", "Zip code of billing destination", and "Address of billing destination" in the slip information table are not seen in the bill illustrated in FIG. 3. The values of the items "Biller", "Zip code of biller", and "Address of biller" in the slip information table are each seen in a specified upper right position in the bill illustrated in FIG. 3. The values of the items "Billing destination", "Zip code of billing destination", and "Address of billing destination" in the slip information table are each seen in a specified upper left position in the bill illustrated in FIG. 3. The dates as values of the items "Billing date" and "Term for payment" in the slip information table are different in format from the dates as values of the items "Date of issue" and "Scheduled date of payment" in the bill illustrated in FIG. 3. The format of a value "Corporation" of each of the items "Biller" and "Billing destination" in the slip information table is different from the format in the bill illustrated in FIG. 3.

In the bill illustrated in FIG. 2, item names corresponding to items "Bill No.", "Product name", "Unit price", and "Price" in the article table are represented as "No", "Product", "Unit price (yen)", and "Price (yen)", respectively. Item names corresponding to items "Product code" and "Consumption tax" in the article table are not seen in the bill illustrated in FIG. 2. The values of the item "Product name" in the article table correspond to the values on the right in cells of a column of the item "Product" of a table in the bill illustrated in FIG. 2. The values of the item "Product code" in the article table correspond to the values on the left in the cells of the column of the item "Product" of the table in the bill illustrated in FIG. 2. The values of the item "Consumption tax" in the article table are not seen in the bill illustrated in FIG. 2 but calculated from the values of the item "Price (yen)" in the bill illustrated in FIG. 2.

In the bill illustrated in FIG. 3, item names corresponding to the items "Bill No.", "Product name", and "Price" in the article table are represented as "Invoice No.", "Name of product", and "Amount of money", respectively.

As illustrated in FIG. 5, the storage section 34 is capable of storing a character string attribute model 34c for acquiring the probability of an attribute of a character string in a form.

The storage section 34 stores data 34d for learning a character string attribute, namely, data for learning which attribute in form data a character string corresponds to. The attribute in form data refers to the item name of a certain item or the value of a certain item.

The storage section 34 stores a distributed representation dictionary 34e of words.

The storage section 34 is capable of storing an attribute-positional relation rule 34f indicating the rule of a positional relation of an attribute of a character string in a form.

The storage section 34 stores calculation formula information 34g that contains a calculation formula for calculating a value present in form data but absent in a form.

The storage section 34 stores format information 34h that contains a rule of the format of a value in form data.

The control section 35 includes, for instance, a CPU, a ROM storing programs and various kinds of data, and a RAM that is a memory as a volatile storage device used as a work area for the CPU of the control section 35. The CPU of the control section 35 executes a program stored in the storage section 34 or the ROM of the control section 35.

The control section 35 executes the form data acquiring program 34a so as to implement a character string attribute learning unit 35a that creates the character string attribute model 34c, an attribute-positional relation learning unit 35b that creates the attribute-positional relation rule 34f, a format acquirement unit 35c that acquires a rule of the format of a value in form data, a calculation formula derivation unit 35d that derives a calculation formula for calculating a value absent in a form, an attribute probability acquirement unit 35e that applies the character string attribute model 34c to a character string in the result of character recognition executed on an image of a form, to thereby acquire the probability of an attribute, an attribute probability correction unit 35f that corrects the probability of an attribute with respect to a character string based on the attribute-positional relation rule 34f, a value calculation unit 35g that calculates a value absent in a form to add the calculated value to form data, and a format change unit 35h that changes the format of a value in form data.

The operation of the information processing system 10 is described next.

Initially, description is made on the operation performed by the information processing apparatus 30 when the character string attribute model 34c and the attribute-positional relation rule 34f are created.

Figure 7:
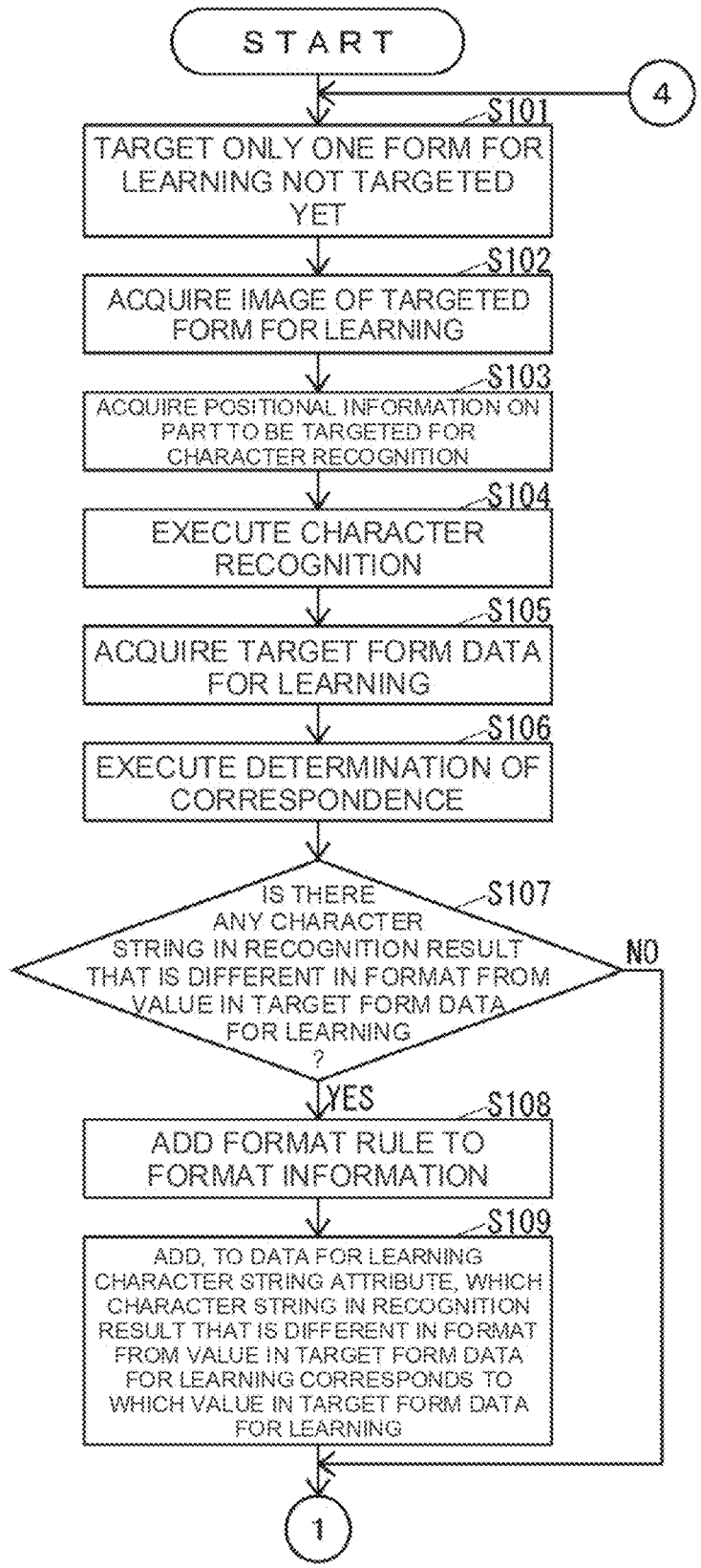
FIG. 7 is a flowchart of part of an operation performed by the information processing apparatus illustrated in FIG. 5 when a character string attribute model and an attribute-positional relation rule are created.
Figure 8:
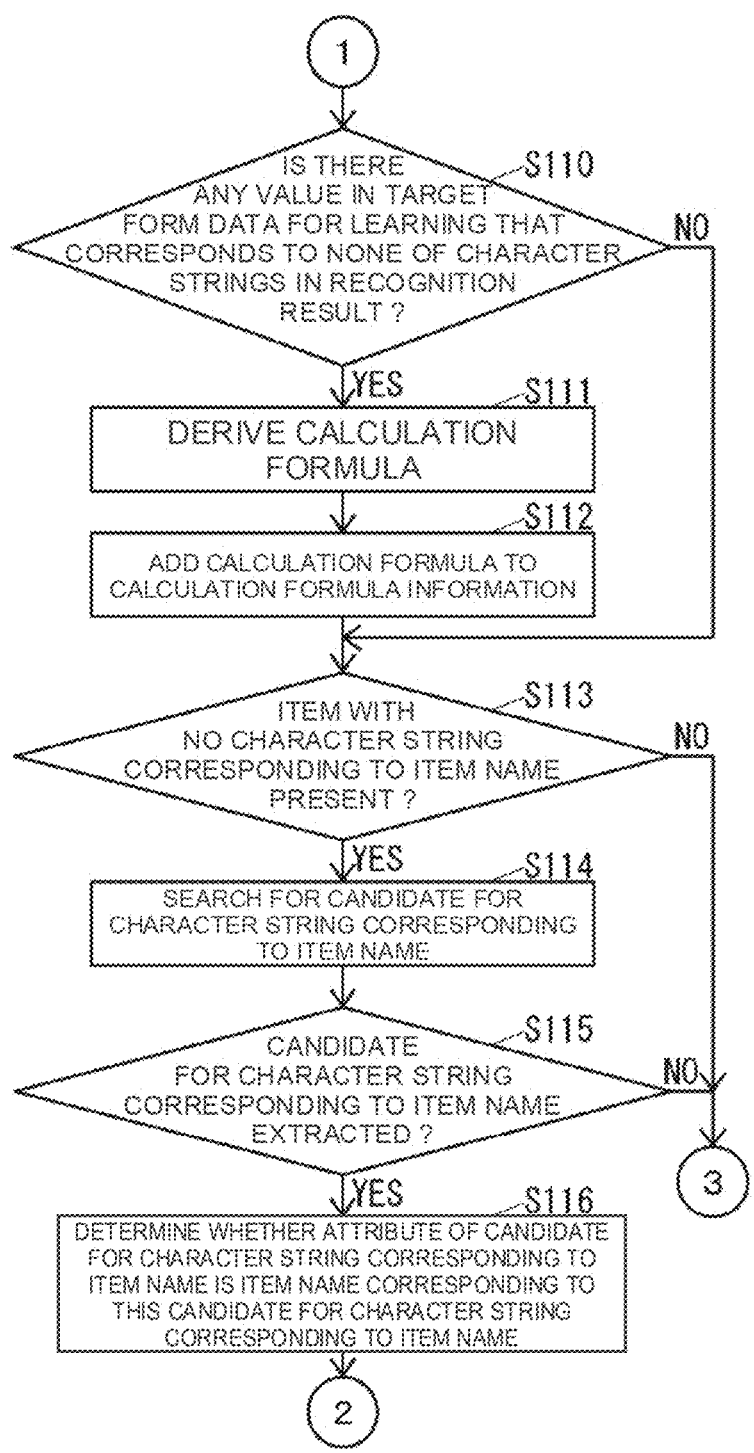
FIG. 8 is a flowchart following the flowchart of FIG. 7.
Figure 9:
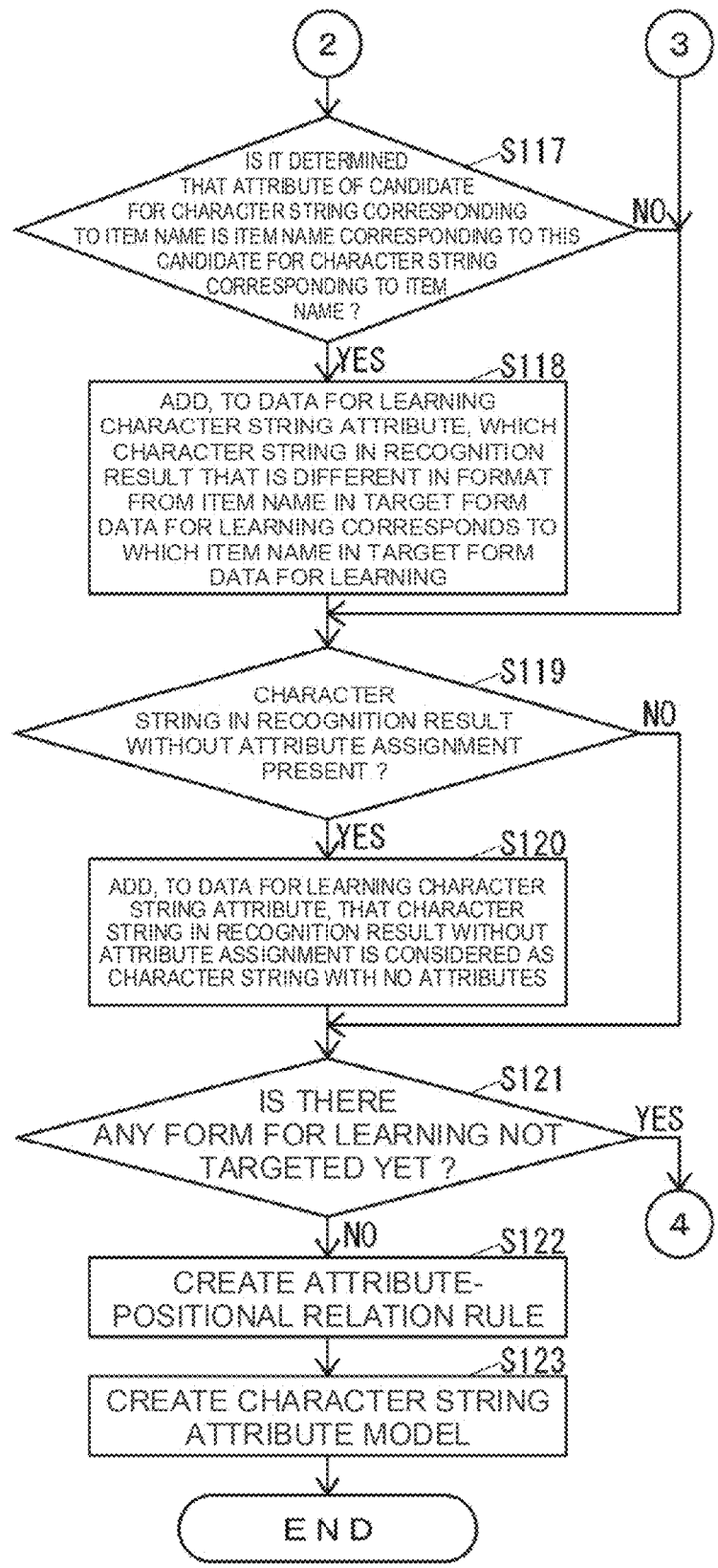
FIG. 9 is a flowchart following the flowchart of FIG. 8.

FIG. 7 is a flowchart of part of the operation performed by the information processing apparatus 30 when the character string attribute model 34c and the attribute-positional relation rule 34f are created. FIG. 8 is a flowchart following the flowchart of FIG. 7. FIG. 9 is a flowchart following the flowchart of FIG. 8.

As illustrated in FIGS. 7 through 9, the character string attribute learning unit 35a targets, among the forms whose form data for learning are included in the data for learning 34b (each of such forms being hereinafter referred to as "form for learning"), only one form for learning not targeted yet (step S101).

The character string attribute learning unit 35a acquires an image of a currently targeted form for learning (step S102). The character string attribute learning unit 35a may acquire an image of a currently targeted form for learning from the form for learning through the scanner 24.

After the process in step S102, the character string attribute learning unit 35a uses such a technology as layout recognition to acquire positional information on a part to be targeted for character recognition in the image of the form for learning (hereinafter referred to as "form image for learning") as acquired in step S102 (step S103). The character string attribute learning unit 35a can acquire positional information on a character string part or a frame part in the form image for learning. The character string attribute learning unit 35a sequentially acquires positional information on a mass of notes, a table, and a cell of the table, for instance, and at last on a character string. The character string attribute learning unit 35a acquires, as positional information on a character string, in which cell of which table the character string is present, in which position in which cell the character string is located, and the like.

After the process in step S103, the character string attribute learning unit 35a uses an optical character recognition (OCR) technology to execute character recognition on the character string part in the form image for learning, on which part the positional information has been acquired in step S103 (step S104).

After the process in step S104, the character string attribute learning unit 35a acquires, from the data for learning 34b, form data for learning corresponding to the currently targeted form for learning (hereinafter referred to as "target form data for learning") (step S105). Since the intention of the creator of the data for learning 34b lies on each table in the data for learning 34b, pieces of data in each table have a close relationship with one another. Therefore, during the acquisition of target form data for learning in step S105, the character string attribute learning unit 35a also acquires, for each piece of data in a currently targeted form data for learning, which table includes the relevant piece of data.

After the process in step S105, the character string attribute learning unit 35a executes determination of the correspondence between a character string (hereinafter referred to as "character string in recognition result") that is found in the result of the character recognition in step S104 (hereinafter referred to as "character recognition result"), and an item name (hereinafter referred to as "item name in target form data for learning") and a value (hereinafter referred to as "value in target form data for learning") each included in the target form data for learning (step S106).

The character string attribute learning unit 35a executes the determination of the correspondence in step S106 taking account of the possibility that a line break is included in the character recognition result. As an example, the address of the billing destination in the bills illustrated in FIGS. 2 and 3, respectively, and the address of the biller in the bill illustrated in FIG. 2 each include a line break, and the character string attribute learning unit 35a executes the determination of the correspondence in step S106 while determining that character strings before and after each line break constitute a single character string.

The character string attribute learning unit 35a executes the determination of the correspondence in step S106 taking account of the difference in character string format between the character string in recognition result and the item name in target form data for learning and value in target form data for learning. As an example, the format of the dates as values of the items "Billing date" and "Term for payment" in the target form data for learning is different from the format in the bill illustrated in FIG. 2, but the character string attribute learning unit 35a executes the determination of the correspondence in step S106 determining that the same dates are referred to. Further, the format of a value "Corporation" of each of the items "Biller" and "Billing destination" in the target form data for learning is different from the format in the bill illustrated in FIG. 3, but the character string attribute learning unit 35a executes the determination of the correspondence in step S106 determining that the same corporations are referred to. Examples of the difference in character string format include a partial omission of a character string.

After the process in step S106, the character string attribute learning unit 35a determines whether a character string in recognition result that is different in format from a value in target form data for learning is present in the result of the determination of the correspondence in step S106 (hereinafter referred to as "correspondence determination result") (step S107).

If it is determined, in step S107, that a character string in recognition result that is different in format from a value in target form data for learning is present in the correspondence determination result, the format acquirement unit 35c adds, to the format information 34h, a rule of the format based on a combination of the value in target form data for learning and the character string in recognition result, which are different in format from each other in the correspondence determination result (step S108).

After the process in step S108, the character string attribute learning unit 35a adds, to the data 34d for learning a character string attribute, which character string in recognition result different in format from a value in target form data for learning corresponds to a value of an item with which item name in target form data for learning, that is to say, corresponds to which value in target form data for learning (step S109).

If it is determined, in step S107, that a character string in recognition result that is different in format from a value in target form data for learning is not present in the correspondence determination result or when the process in step S109 terminates, the value calculation unit 35g determines whether a value in target form data for learning that corresponds to none of character strings in recognition result is present (step S110). In some cases, the subtotal, the consumption tax, and the like are originally not contained in the form, whose image is acquired in step S102, and are added during the creation of target form data for learning. In other words, a value in target form data for learning that corresponds to none of character strings in recognition result may be present.

If determining, in step S110, that a value in target form data for learning that corresponds to none of character strings in recognition result is present, the value calculation unit 35g analyzes the relationship between values in the form data for learning with respect to the value in target form data for learning that corresponds to none of character strings in recognition result and derives a calculation formula from another value in the form data for learning (step S111). The value calculation unit 35g preferably derives a calculation formula by analyzing the relationship between values in form data for learning of multiple forms rather than analyzing the relationship between values in form data for learning of a single form.

After the process in step S111, the value calculation unit 35g adds, to the calculation formula information 34g, the calculation formula derived in step S111 (step S112).

If it is determined, in step S110, that a value in target form data for learning that corresponds to none of character strings in recognition result is not present or when the process in step S112 terminates, the character string attribute learning unit 35a determines whether the item, whose value in target form data for learning a character string present in the character recognition result corresponds to but whose item name in target form data for learning no character string present in the character recognition result corresponds to, (such item being hereinafter referred to as "item with no character string corresponding to item name") is present among items of the target form data for learning (step S113).

If determining, in step S113, that an item with no character string corresponding to item name is present, the character string attribute learning unit 35a searches for a candidate for the character string, which corresponds to the item name of the item with no character string corresponding to item name (hereinafter referred to as "candidate for character string corresponding to item name"), based on the positional relation in the form image for learning with the character string, which corresponds to the value in target form data for learning of the item with no character string corresponding to item name in the character recognition result (step S114). For instance, the character string attribute learning unit 35a searches the character recognition result for a character string present on the left in the horizontal direction in the form image for learning and a character string present above in the vertical direction in the form image for learning with respect to the character string, which corresponds to the value in target form data for learning of the item with no character string corresponding to item name in the character recognition result, so as to extract a character string searched for as a candidate for character string corresponding to item name.

After the process in step S114, the character string attribute learning unit 35a determines whether a candidate for character string corresponding to item name has been extracted by the search in step S114 (step S115).

If determining, in step S115, that a candidate for character string corresponding to item name has been extracted by the search in step S114, the character string attribute learning unit 35a uses the distributed representation dictionary 34e to decide the similarity between the candidate for character string corresponding to item name as extracted by the search in step S114 and an item name corresponding to the candidate for character string corresponding to item name, so as to decide whether the attribute of the candidate for character string corresponding to item name as extracted by the search in step S114 is the item name corresponding to the candidate for character string corresponding to item name (step S116).

After the process in step S116, the character string attribute learning unit 35a determines whether it is decided, in step S116, that the attribute of the candidate for character string corresponding to item name as extracted by the search in step S114 is the item name corresponding to the candidate for character string corresponding to item name (step S117).

If determining, in step S117, that it is decided, in step S116, that the attribute of the candidate for character string corresponding to item name as extracted by the search in step S114 is the item name corresponding to the candidate for character string corresponding to item name, the character string attribute learning unit 35a adds, to the data 34d for learning a character string attribute, which character string in recognition result different in format from an item name in target form data for learning corresponds to which item name in target form data for learning (step S118).

If determining, in step S113, that an item with no character string corresponding to item name is not present, or if determining, in step S115, that a candidate for character string corresponding to item name has not been extracted by the search in step S114, or if determining, in step S117, that it is not decided, in step S116, that the attribute of the candidate for character string corresponding to item name as extracted by the search in step S114 is the item name corresponding to the candidate for character string corresponding to item name, or after performing the process in step S118, the character string attribute learning unit 35a determines whether a character string in recognition result that corresponds neither to an item name in target form data for learning nor a value in target form data for learning, namely, a character string in recognition result without attribute assignment is present (step S119).

If determining, in step S119, that a character string in recognition result without attribute assignment is present, the character string attribute learning unit 35a adds, to the data 34d for learning a character string attribute, that the character string in recognition result without attribute assignment is considered as a character string with no attributes (step S120).

If determining, in step S119, that a character string in recognition result without attribute assignment is not present or when the process in step S120 terminates, the character string attribute learning unit 35a determines whether a form for learning not targeted yet is present (step S121).

If determining, in step S121, that a form for learning not targeted yet is present, the character string attribute learning unit 35a performs the process in step S101.

If it is determined, in step S121, that a form for learning not targeted yet is not present, the attribute-positional relation learning unit 35b learns the positional relation between attributes in all the forms for learning so as to create the attribute-positional relation rule 34f (step S122). The attribute-positional relation rule 34f includes a rule of the positional relation between attributes within a group of attributes (hereinafter referred to as "attribute group") and a rule of the positional relation between attribute groups. Exemplary attribute groups include a group of attributes always located close to one another in a form, a group of attributes always located on a horizontal line in a form, and a group of attributes always located on a vertical line in a form. Exemplary attribute groups also include the attribute group related to the biller, to which group three attributes, the name of the biller, the zip code of the biller, and the address of the biller, belong, and the attribute group related to the billing destination, to which group three attributes, the name of the billing destination, the zip code of the billing destination, and the address of the billing destination, belong.

The rule of the positional relation between attributes in an attribute group refers to a rule created by finding, for each attribute, the probability that the relevant attribute appears on the left or above in a form, namely, a rule of vertical and horizontal positional relations between attributes in a form. In the attribute group related to the biller, for instance, it is highly probable that the name of the biller appears in the uppermost position in a form, that the zip code of the biller appears in the second uppermost position in a form, and that the address of the biller appears in the third uppermost position in a form.

The rule of the positional relation between attribute groups refers to a rule created by finding, for each attribute group, the probability that the relevant attribute group appears on the left or above in a form, namely, a rule of vertical and horizontal positional relations between attribute groups in a form. For instance, it is highly probable that the attribute group related to the billing destination appears to the left hand of the attribute group related to the biller in a form.

After the process in step S122, the character string attribute learning unit 35a uses a recurrent neural network (RNN) or the like to create the character string attribute model 34c based on the data for learning 34b and the data 34d for learning a character string attribute (step S123), then ends the operation illustrated in FIGS. 7 through 9.

Next, description is made on the operation performed by the information processing apparatus 30 when form data is automatically created from a form.

Figure 10:
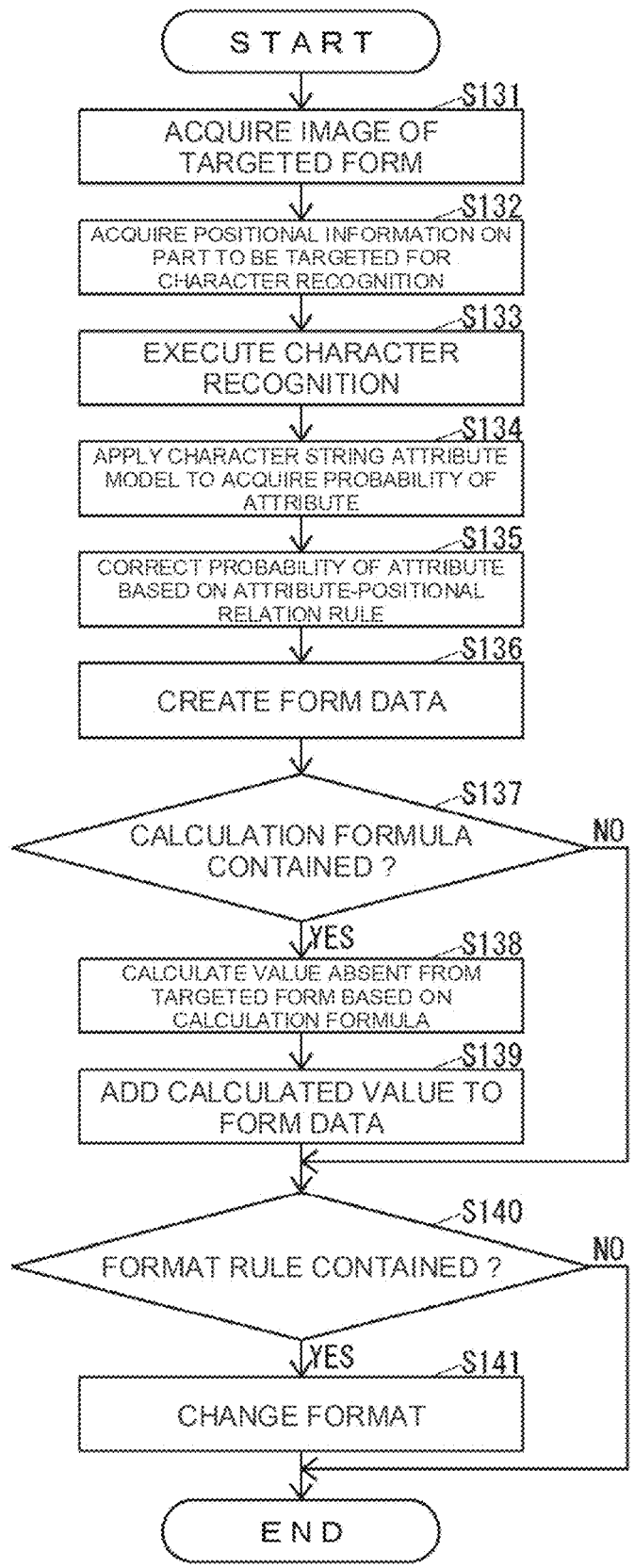
FIG. 10 is a flowchart of an operation performed by the information processing apparatus illustrated in FIG. 5 when form data are automatically created from a form.

FIG. 10 is a flowchart of the operation performed by the information processing apparatus 30 when form data is automatically created from a form.

As illustrated in FIG. 10, the attribute probability acquirement unit 35e acquires an image of a targeted form, similarly to the process in step S102 (step S131). The attribute probability acquirement unit 35e may acquire an image of a targeted form from the form through the scanner 24.

After the process in step S131, the attribute probability acquirement unit 35e uses such a technology as layout recognition to acquire positional information on a part to be targeted for character recognition in the image of the form (hereinafter referred to as "form image") as acquired in step S131, similarly to the process in step S103 (step S132).

After the process in step S132, the attribute probability acquirement unit 35e uses an OCR technology to execute character recognition on the character string part in the form image, on which part the positional information has been acquired in step S132, similarly to the process in step S104 (step S133).

After the process in step S133, the attribute probability acquirement unit 35e applies the character string attribute model 34c to a character string recognized by the character recognition in step S133, to thereby acquire the probability of an attribute (step S134).

After the process in step S134, the attribute probability correction unit 35f corrects the probability as acquired in step S134, based on the position in the form of the character string recognized by the character recognition in step S133 and the attribute-positional relation rule 34f (step S135). For instance, the attribute probability correction unit 35f finds the final probability of an attribute with respect to the character string recognized by the character recognition in step S133 by multiplying the probability of an attribute as acquired based on the position in the form and the attribute-positional relation rule 34f by the probability of an attribute as acquired in step S134.

After the process in step S135, the attribute probability correction unit 35f decides the attribute of the character string recognized by the character recognition in step S133 based on the probability as corrected in step S135, so as to create form data (step S136).

After the process in step S136, the value calculation unit 35g determines whether a calculation formula is contained in the calculation formula information 34g (step S137).

If determining, in step S137, that a calculation formula is contained in the calculation formula information 34g, the value calculation unit 35g calculates a value absent in the targeted form based on the calculation formula contained in the calculation formula information 34g (step S138).

After the process in step S138, the value calculation unit 35g adds the value calculated in step S138 to the form data created in step S136 (step S139).

If it is determined, in step S137, that any calculation formula is not contained in the calculation formula information 34g or when the process in step S139 terminates, the format change unit 35h determines whether a rule of a format is contained in the format information 34h (step S140).

If determining, in step S140, that a rule of a format is contained in the format information 34h, the format change unit 35h changes the format of a value in the form data based on the rule contained in the format information 34h (step S141).

If determining, in step S140, that any rule of a format is not contained in the format information 34h or when the process in step S141 terminates, the format change unit 35h ends the operation illustrated in FIG. 10.

As a specific example of the operation illustrated in FIG. 10, an automatic creation of form data from the form illustrated in FIG. 2 is described.

Figure 11:
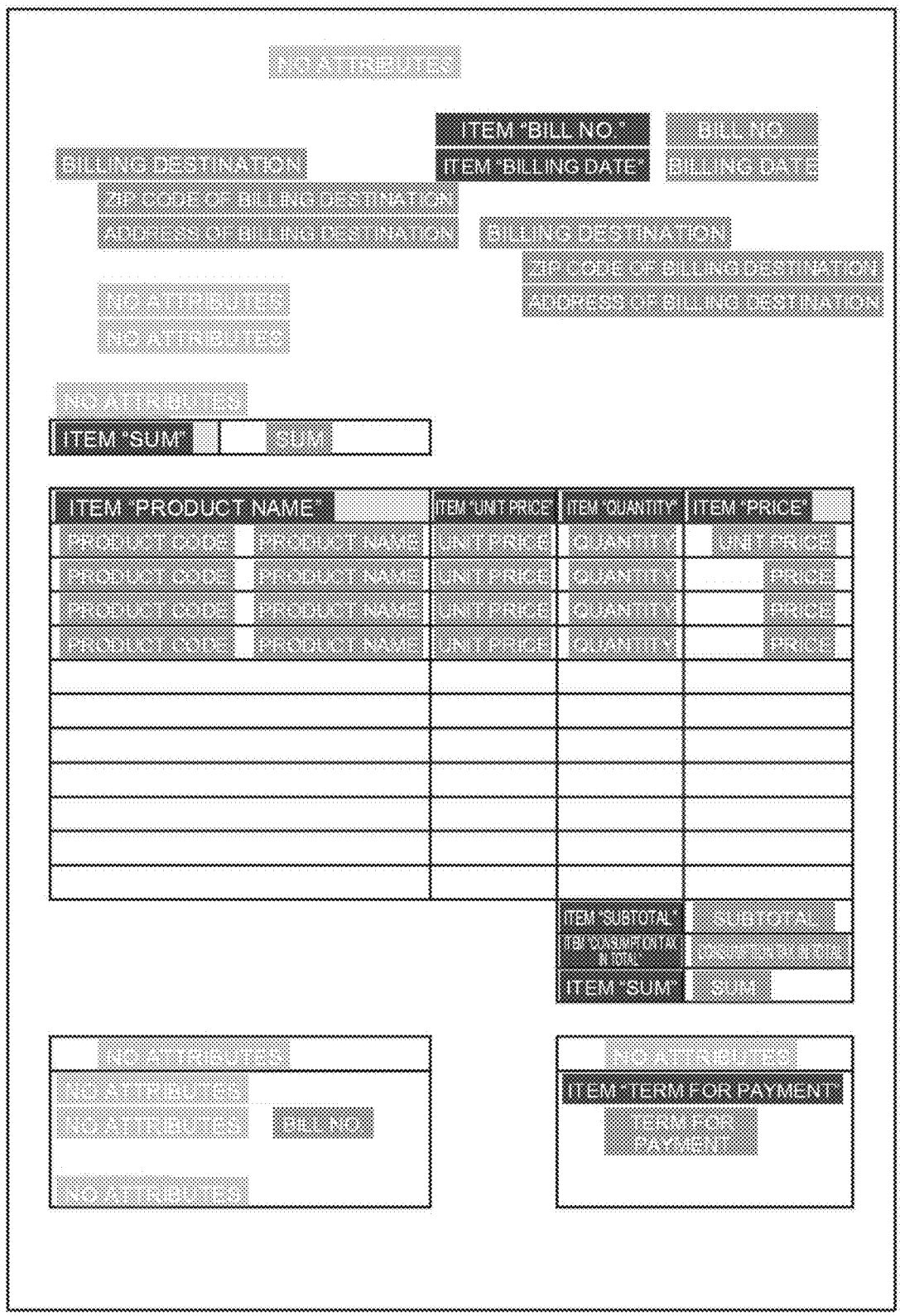
FIG. 11 is a diagram illustrating an example of attributes of character strings contained in the form illustrated in FIG. 2, the attributes having been decided by application of the character string attribute model.
Figure 12:
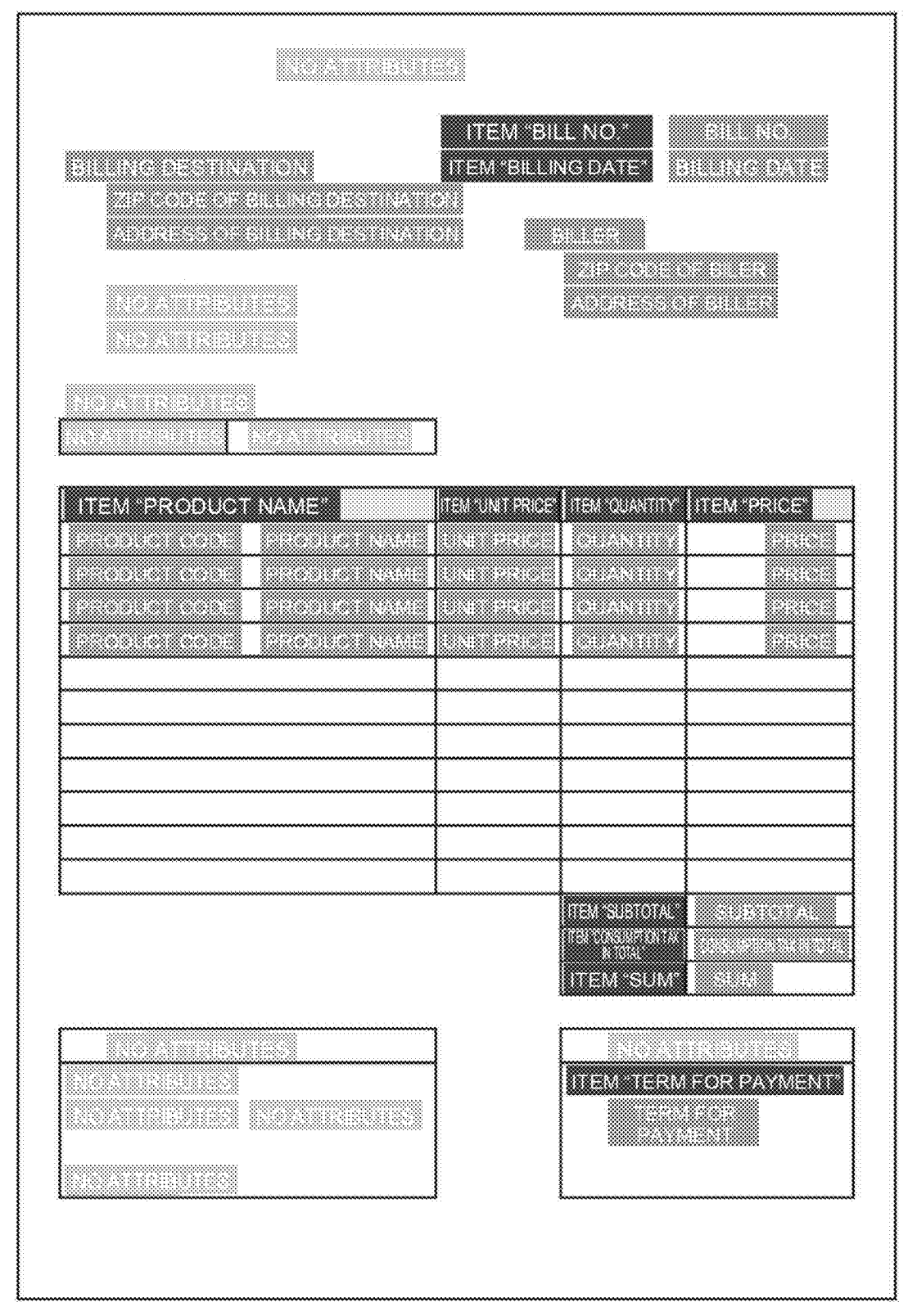

FIG. 11 is a diagram illustrating an example of attributes of character strings contained in the form illustrated in FIG. 2, the attributes having been decided by application of the character string attribute model 34c. FIG. 12 is a diagram illustrating an example of attributes of the character strings contained in the form illustrated in FIG. 2, the attributes having been corrected by application of the attribute-positional relation rule 34f.

If form data are to be automatically created from the form illustrated in FIG. 2, the attributes, which are decided based on the probability acquired in step S134, are as illustrated in FIG. 11, for instance.

The attributes, which are decided based on the probability corrected in step S135 after the process in step S134, are as illustrated in FIG. 12, for instance. In the example illustrated in FIG. 12, the character strings arranged on an upper right side in the form, "Corporation ΔΔ", "987-6543", and "ΔΔΔΔ 6F, 9-8-7 ΔΔΔ, Δ-ku, ΔΔ-shi, Kanagawa", which are decided as values of the items "Billing destination", "Zip code of billing destination", and "Address of billing destination", respectively, in the example illustrated in FIG. 11, are decided as values of the items "Biller", "Zip code of biller", and "Address of biller", respectively. The character string "Sum (tax inclusive)" as decided as an item name of the item "Sum" and the character string "¥2640" as decided as a value of the item "Sum", both arranged on an upper left side in the form, are each decided as "no attributes". In addition, the character string "0000000" as decided as a value of the item "Bill No.", which is arranged on a lower left side in the form, is decided as "no attributes".

FIG. 13A is a diagram illustrating an example of a slip information table of form data created based on the attributes illustrated in FIG. 12. FIG. 13B is a diagram illustrating an example of an article table of the form data created based on the attributes illustrated in FIG. 12.

The form data created in step S136 based on the attributes illustrated in FIG. 12 are as illustrated in FIGS. 13A and 13B. In FIG. 13B, the values of the item "Consumption tax" are not input.

FIG. 14A is a diagram illustrating an example of a slip information table of form data automatically created from the form illustrated in FIG. 2. FIG. 14B is a diagram illustrating an example of an article table of the form data automatically created from the form illustrated in FIG. 2.

In the slip information table illustrated in FIG. 14A, the values of the items "Billing date" and "Term for payment" are changed in format in step S141 as compared with the slip information table illustrated in FIG. 13A. In the article table illustrated in FIG. 14B, the values of the item "Consumption tax" are added in step S139 as compared with the article table illustrated in FIG. 13B. In addition, the value "1,000" of the item "Price" in the article table illustrated in FIG. 13B is changed into "1000" in the article table illustrated in FIG. 14B by the change in format in step S141.

The form data created by the operation illustrated in FIG. 10 can be used as a new form data for learning after the confirmation by the user. The control section 35 is able to improve the accuracy of form data automatically created from a form by additionally performing the operation illustrated in FIGS. 7 through 9 based on the new form data for learning.

As described above, the information processing apparatus 30 uses form data for learning and a character string in the result of character recognition executed on an image of a form for learning to learn the character string attribute model 34c and the attribute-positional relation rule 34f (steps S101 through S123), so that it is possible to obtain the character string attribute model 34c and the attribute-positional relation rule 34f, which are suitable for the form for learning and, as a result, improve the appropriateness of form data automatically acquired from a form.

The information processing apparatus 30 creates the character string attribute model 34c so that a character string different in format from a value of an item in form data for learning but corresponding to the value may be acquired as the value of the item (steps S109 and S123).

Consequently, it is possible to further improve the appropriateness of form data automatically acquired from a form.

The information processing apparatus 30 changes the format of a character string different in format from a value of an item in form data but corresponding to the value into the format of the value of the item in the form data (step S141), so that it is possible to further improve the appropriateness of form data automatically acquired from a form.

If an item with no character string corresponding to item name is present (YES in step S113), the information processing apparatus 30 searches for a candidate for character string corresponding to item name as a candidate for a character string corresponding to the item name of the item with no character string corresponding to item name, based on the positional relation in an image of a form for learning with a character string corresponding to the value in form data for learning of the item with no character string corresponding to item name in the result of character recognition executed on the image of the form for learning (step S114) and, if it is decided based on the similarity between the candidate for character string corresponding to item name as extracted by the search and an item name corresponding to the candidate for character string corresponding to item name that the attribute of the candidate for character string corresponding to item name is the item name corresponding to this candidate (YES in step S117), creates a character string attribute model also based on which item name the candidate for character string corresponding to item name corresponds to (steps S118 and S123). Consequently, it is possible to further improve the appropriateness of form data automatically acquired from a form.

The information processing apparatus 30 analyzes the relationship between values in form data for learning with respect to a value in the form data for learning that corresponds to none of character strings in the result of character recognition executed on an image of a form for learning, so as to derive a calculation formula from another value in the form data for learning (step S111) and adds a value absent in a form to form data based on the derived calculation formula (steps S138 and S139), so that it is possible to further improve the appropriateness of form data automatically acquired from a form.

The information processing apparatus 30 uses a form for learning and form data for learning to learn the character string attribute model 34c and the attribute-positional relation rule 34f, so that it is possible to appropriately acquire form data from a form wished for by a user if a form for learning and form data for learning are prepared with respect to the form whished for by the user. If a user makes the information processing apparatus 30 acquire form data not from a bill but a medical examination report illustrated in FIG. 15, for instance, the user needs to use the medical examination report illustrated in FIG. 15 or another medical examination report as a form for learning so as to newly learn a character string attribute model for the medical examination report and an attribute-positional relation rule for the medical examination report.

What is claimed is:
1. A form data acquirement system that automatically acquires form data from a form as data based on the form, comprising:
a character string attribute learning unit that creates a character string attribute model for acquiring a probability of an attribute of a character string in the form;
an attribute-positional relation learning unit that creates an attribute-positional relation rule indicating a rule of a positional relation of the attribute of the character string in the form;
an attribute probability acquirement unit that applies the character string attribute model to a character string in a result of character recognition executed on an image of the form, and acquires a probability of an attribute; and
an attribute probability correction unit that corrects the probability based on a position, in the form, of the character string in the result of the character recognition executed on the image of the form and the attribute-positional relation rule,
wherein the character string attribute learning unit executes determination of correspondence between a character string in a result of character recognition executed on an image of a form for learning that forms a basis for creation of form data for learning, which is the form data created from the form in advance, and an attribute in the form data for learning to create the character string attribute model, and
wherein the attribute-positional relation learning unit learns an attribute-positional relation in the form for learning to create the attribute-positional relation rule.

2. The form data acquirement system according to claim 1, wherein, if a character string different in format from an item value among attributes in the form data for learning is present in a result of the determination of the correspondence, the character string attribute learning unit creates the character string attribute model also based on which value the character string corresponds to.

3. The form data acquirement system according to claim 2, comprising:
a format acquirement unit that acquires a rule of a format of a value in the form data if a character string different in format from an item value among the attributes in the form data for learning is present in the result of the determination of the correspondence; and
a format change unit that changes the format of the value in the form data based on the rule acquired by the format acquirement unit.

4. The form data acquirement system according to claim 1, wherein, if an item with no character string corresponding to item name that is an item whose value as an attribute in the form data for learning a character string in the result of the character recognition executed on the image of the form for learning corresponds to but whose item name as an attribute in the form data for learning any character string in the result of the character recognition does not correspond to is present, the character string attribute learning unit searches for a candidate for a character string corresponding to the item name of the item with no character string corresponding to item name based on a positional relation in the image of the form for learning with the character string, which corresponds to the value in the form data for learning of the item with no character string corresponding to item name in the result of the character recognition executed on the image of the form for learning and, if deciding based on a similarity between the candidate extracted by search and an item name corresponding to the candidate that an attribute of the candidate is the item name corresponding to the candidate, creates the character string attribute model also based on which item name the candidate corresponds to.

5. The form data acquirement system according to claim 1, comprising:
a calculation formula derivation unit that derives a calculation formula for calculating a value absent in the form; and
a value calculation unit that calculates the value absent in the form based on the calculation formula and adds the value absent in the form calculated to the form data,
wherein the calculation formula derivation unit analyzes a relationship between values in the form data for learning with respect to a value of an item among attributes in the form data for learning, whose value corresponds to none of character strings in the result of the character recognition executed on the image of the form for learning, and derives the calculation formula from another value in the form data for learning.

6. A non-transitory computer readable recording medium storing a form data acquiring program for automatically acquiring form data from a form as data based on the form, wherein the form data acquiring program allows a computer to implement;
a character string attribute learning unit that creates a character string attribute model for acquiring a probability of an attribute of a character string in the form;
an attribute-positional relation learning unit that creates an attribute-positional relation rule indicating a rule of a positional relation of the attribute of the character string in the form;
an attribute probability acquirement unit that applies the character string attribute model to a character string in a result of character recognition executed on an image of the form, and acquires a probability of an attribute; and
an attribute probability correction unit that corrects the probability based on a position in the form of the character string in the result of the character recognition executed on the image of the form and the attribute-positional relation rule,
wherein the character string attribute learning unit executes determination of correspondence between a character string in a result of character recognition executed on an image of a form for learning that forms a basis for creation of form data for learning, which is the form data created from the form in advance, and an attribute in the form data for learning to create the character string attribute model, and
wherein the attribute-positional relation learning unit learns an attribute-positional relation in the form for learning to create the attribute-positional relation rule.

* * * * *